United States Patent
Kim et al.

(10) Patent No.: US 9,893,824 B2
(45) Date of Patent: Feb. 13, 2018

(54) PACKET TRANSMISSION/RECEPTION METHOD AND APPARATUS IN WIRELESS COMMUNICATION SYSTEM

(71) Applicant: Intellectual Discovery Co., Ltd., Seoul (KR)

(72) Inventors: Yun Joo Kim, Suwon-si (KR); Sok-Kyu Lee, Daejeon (KR); Hyun Kyu Chung, Daejeon (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 181 days.

(21) Appl. No.: 14/804,546

(22) Filed: Jul. 21, 2015

(65) Prior Publication Data

US 2015/0326406 A1   Nov. 12, 2015

Related U.S. Application Data

(63) Continuation of application No. 13/902,607, filed on May 24, 2013, now Pat. No. 9,118,426, which is a continuation of application No. 13/046,458, filed on Mar. 11, 2011, now Pat. No. 8,472,386.

(30) Foreign Application Priority Data

Mar. 12, 2010   (KR) ................ 10-2010-0022417

(51) Int. Cl.
*H04H 20/42* (2008.01)
*H04L 12/18* (2006.01)
*H04W 28/06* (2009.01)
*H04L 29/08* (2006.01)

(52) U.S. Cl.
CPC .......... *H04H 20/42* (2013.01); *H04L 12/189* (2013.01); *H04L 69/324* (2013.01); *H04W 28/06* (2013.01)

(58) Field of Classification Search
None
See application file for complete search history.

(56) References Cited

U.S. PATENT DOCUMENTS

| | | | |
|---|---|---|---|
| 7,286,501 B2 | 10/2007 | Kwon et al. | |
| 7,352,718 B1 | 4/2008 | Perahia et al. | |
| 7,529,178 B1 | 5/2009 | Loc | |
| 8,027,366 B1 | 9/2011 | Tang et al. | |
| 8,045,813 B2 * | 10/2011 | Lee ..................... | H04N 19/82 382/238 |
| 8,054,813 B2 | 11/2011 | Kim et al. | |
| 8,135,015 B2 | 3/2012 | Rajkotia et al. | |

(Continued)

FOREIGN PATENT DOCUMENTS

| | | |
|---|---|---|
| JP | 2009-005409 A | 1/2009 |
| JP | 2010-11255 A | 1/2010 |

(Continued)

*Primary Examiner* — Anh Ngoc Nguyen
(74) *Attorney, Agent, or Firm* — NSIP Law (57) ABSTRACT

A method for simultaneously transmitting packets to one or more users in a wireless communication system includes: generating the packets which include length information and are to be transmitted to the one or more users; and simultaneously transmitting the generated packets to the one or more users. The length information includes information representing a unit of the length information and information representing lengths of the packets according to the unit.

12 Claims, 8 Drawing Sheets

(56) References Cited

U.S. PATENT DOCUMENTS

| | | |
|---|---|---|
| 2003/0086385 A1 | 5/2003 | Kwon et al. |
| 2005/0141420 A1 | 6/2005 | Li et al. |
| 2007/0091932 A1 | 4/2007 | Hwang |
| 2008/0109711 A1* | 5/2008 | Morioka ............... H04L 1/0063 714/807 |
| 2009/0323723 A1 | 12/2009 | Tominaga |
| 2010/0111203 A1 | 5/2010 | Aoki et al. |
| 2010/0208749 A1* | 8/2010 | Chun ..................... H04L 69/22 370/474 |
| 2011/0110454 A1* | 5/2011 | Sampath ................. H04L 1/02 375/295 |
| 2011/0149927 A1* | 6/2011 | Stacey ................. H04L 1/0046 370/338 |

FOREIGN PATENT DOCUMENTS

| | | |
|---|---|---|
| KR | 10-2002-0049790 A | 6/2002 |
| KR | 10-2003-0037948 A | 5/2003 |
| KR | 10-2007-0041870 A | 4/2007 |

\* cited by examiner

PACKET TRANSMISSION/RECEPTION METHOD AND APPARATUS IN WIRELESS COMMUNICATION SYSTEM

CROSS-REFERENCE(S) TO RELATED APPLICATIONS

The present application is a continuation of U.S. patent application Ser. No. 13/902,607, filed on May 24, 2013, which is a continuation of U.S. patent application Ser. No. 13/046,458, filed on Mar. 11, 2011, which claims priority of Korean Patent Application No. 10-2010-0022417, filed on Mar. 12, 2010, which are all incorporated herein by reference in their entirety.

BACKGROUND OF THE INVENTION

Field of the Invention

Exemplary embodiments of the present invention relate to a packet transmission/reception method and apparatus in a wireless communication system.

Description of Related Art

The throughput of wireless communication systems is not high enough to support various high-capacity multimedia services. Since multi-users share wireless resources, the data rate of wireless services sensed by the users decreases remarkably. In this regard, research is conducted on various techniques to improve the throughput of a wireless communication system for multi-users by increasing a bandwidth to expand wireless resources shared by multi-users, or by implementing a desired beam for communication with each user while using wireless resources of the same bandwidth.

Since a medium access control (MAC) protocol of a wireless communication system operates on the basis of carrier sense multiple access/collision avoidance (CSMA/CA), resource waste may occur in a channel contention process. In order to solve such a problem, an enhanced MAC protocol defined by IEEE 802.11e has proposed a burst transmission scheme in which multiple MAC protocol data units (MPDUs) are transmitted at a short inter-frame space (SIFS) during a transmission opportunity (TXOP) time when a transmission right for a wireless resource is acquired, and block ACKs for the multiple MPDUs are received. Furthermore, IEEE 802.11n has defined an aggregated MAC service data unit (MSDU) (hereinafter, referred to as A-MSDU) and an aggregated MPDU (hereinafter, referred to as A-MPDU). In this case, MSDUs and MPDUs (which are a transmission unit) may be respectively aggregated without IFS, and then transmitted through a one-time contention process for a wireless resource.

With the development of the above-described wireless communication system, IEEE 802.11ac specifies that, in order to construct a high-rate wireless communication system, a data rate of up to 1 Gbps should be supported by a MAC service access point (SAP) of an access point (AP) in a wireless communication system including one AP and two stations (STAs), and a data rate of up to 500 Mbps is required by a MAC SAP of an STA for a point-to-point environment. Furthermore, as the requirements of the high-performance wireless communication system, each AP and STA need to support compatibility with the existing wireless communication system (the IEEE 802.11a/n system).

In the wireless communication system, a data transmitter (AP or STA) acquires a wireless channel and then transmits data together with information required for the transmission of the data. A structure including the data and the information required for the data transmission may be referred to as a packet. At this time, the information required for the data transmission is defined as a promised value in a structure named 'header'.

Figure 1:
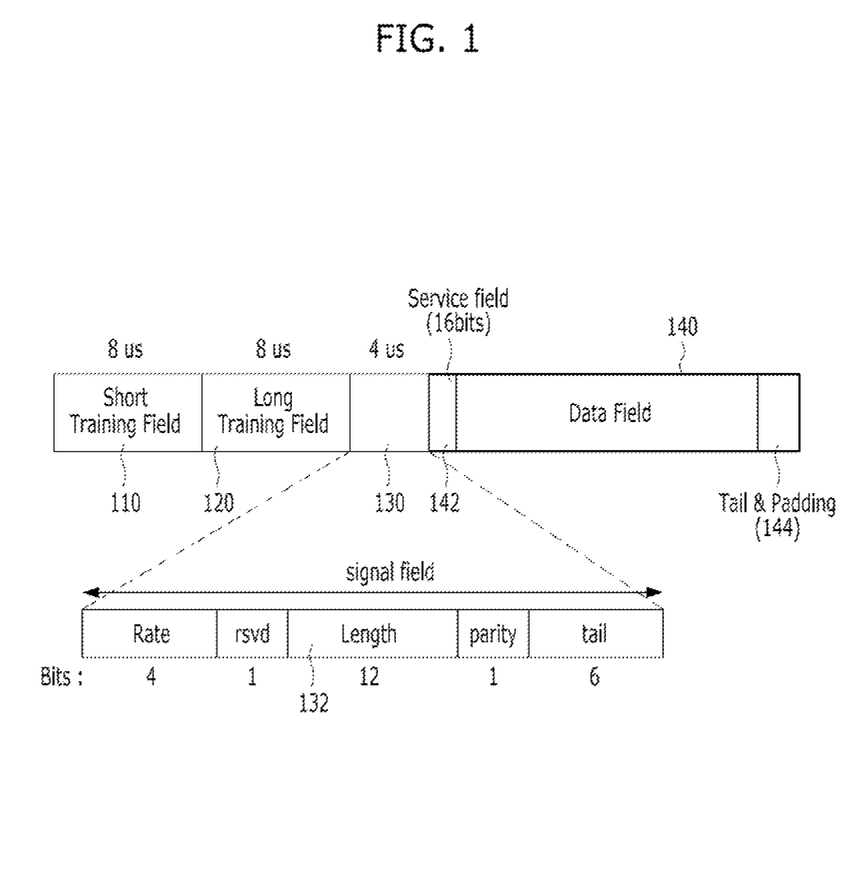

FIG. 1 illustrates the structure of a packet defined in IEEE 802.11a. A protocol header and data information of a previous stage, for example, a MPDU with a header and data of a MAC protocol is transmitted to a receiver, together with short and long training fields 110 and 120 storing information required for a physical layer (PHY), a signal field 130, a service field 142, and a tail & padding field 144, and the receiver receives the data using information acquired from the received fields. At this time, the data included in a data field 140 as well as the service field 142 and the tail & pad field 144 has a variable length within the maximum range. It is possible for the receiver to recognize the length of the data through information stored in a length field 132 of the signal field 130.

Figure 2:
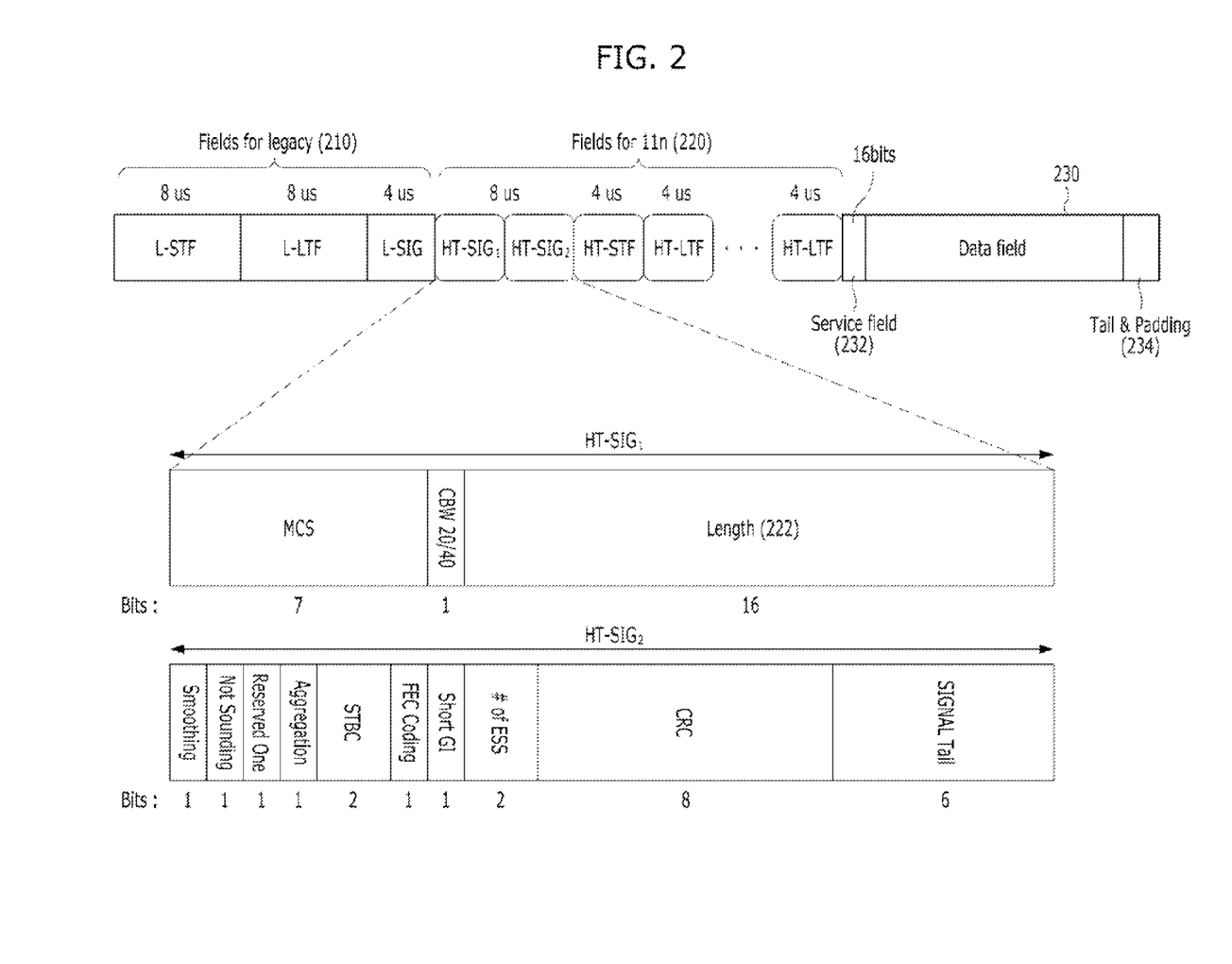
FIG. 2 is a diagram illustrating the structure of a packet with a mixed form for an IEEE 802.11a system and an IEEE 802.11n system.

FIG. 2 illustrates the structure of a packet with a mixed format, which may be received both in an IEEE 802.11a system and an IEEE 802.11n system. Referring to FIG. 2, as the packet with a mixed format includes legacy fields 210 such as a legacy-short training field (L-STF), a legacy-long training field (L-LTF), and a legacy-signal field (L-SIG), the IEEE 802.11a system may acquire information required for the reception of data. Furthermore, the packet includes fields 220 for the IEEE 802.11n system from an HT-SIG field such that the IEEE 802.11n system may acquire information required for the reception of data. For example, the IEEE 802.11a system uses length information stored in the L-SIG field, and the IEEE 802.11n system uses length information stored in the L-SIG field or information stored in a length field 222 in the HT-SIG$_1$, thereby recognizing the length of data.

As the packet structures as illustrated in FIGS. 1 and 2 are defined in the IEEE 802.11a and 802.11n wireless communication systems, there is a demand for a packet structure suitable for a high-performance wireless communication system (e.g., a wireless communication system based on multi-user multi-input multi-output (MU-MIMO) technology), which is capable of simultaneously transmitting different packets to multi-users, respectively.

SUMMARY OF THE INVENTION

An embodiment of the present invention is directed to a method and an apparatus capable of simultaneously transmitting/receiving packets to/from one or more users in order to satisfy requirements of a high-performance wireless communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a method for simultaneously transmitting packets to one or more users in a wireless communication system includes: generating the packets which include length information and are to be transmitted to the one or more users; and simultaneously transmitting the generated packets to the one or more users, wherein the length information includes information representing a unit of the length information and information representing lengths of the packets according to the unit.

In accordance with another embodiment of the present invention, a method for receiving a packet from a transmitter which simultaneously transmits packets to one or more users in a wireless communication system includes: receiving a packet including length information of the packet; and processing the packet using the length information of the received packet, wherein the length information includes information representing a unit of the length information and information representing lengths of the packets according to the unit.

In accordance with another embodiment of the present invention, an apparatus for simultaneously transmitting packets to one or more users in a wireless communication system includes: a packet generation unit configured to generate packets which include length information and are to be transmitted to the one or more users; and a transmission unit configured to simultaneously transmit the generated packets to the one or more users, wherein the length information includes information representing a unit of the length information and information representing lengths of the packets according to the unit.

In accordance with another embodiment of the present invention, an apparatus for receiving a packet from a transmitter which simultaneously transmits packets to one or more users in a wireless communication system includes: a reception unit configured to receive a packet including length information of the packet; and a packet processing unit configured to process the packet using the length information of the received packet, wherein the length information includes information representing a unit of the length information and information representing lengths of the packets according to the unit.

BRIEF DESCRIPTION OF THE DRAWINGS

FIG. 1 is a diagram illustrating the structure of a packet defined in IEEE 802.11a.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The present invention relates to a method and an apparatus for simultaneously transmitting/receiving packets to/from one or more users in a wireless communication system. For the purpose of convenience, since the present invention is described based on a packet structure to be used in an IEEE 802.11ac wireless communication system (also called a very high throughput (VHT) system), the present invention is not limited to the name of a specific wireless communication system. Thus, the present invention can support various environments such as multi-channel environments (e.g., transmission/reception using frequencies different from each other) and wireless LAN environments of a multi-user multi-input multi-output (hereinafter, referred to as a MU-MIMO) system. Furthermore, it goes without saying that it is possible to support various high speed wireless services based on the wireless communication system proposed by the present invention.

Figure 3:
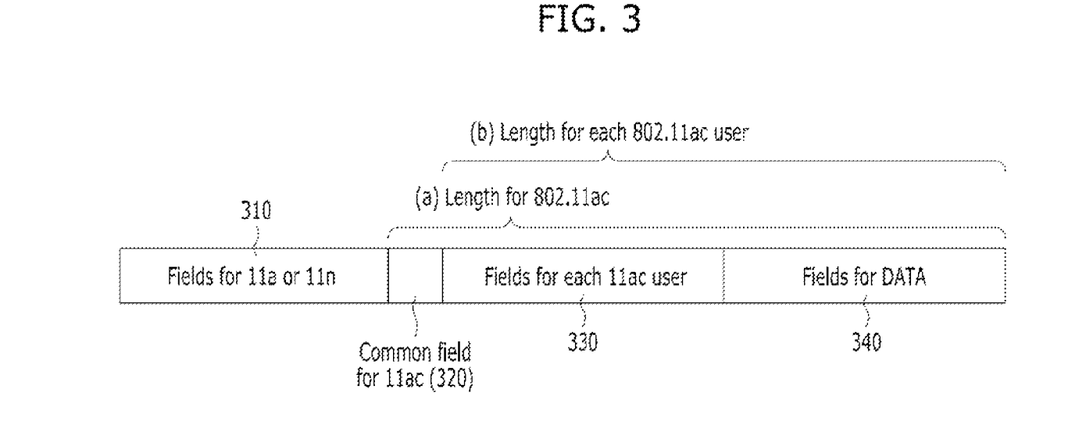
FIGS. 3 to 6 are diagrams illustrating the structures of packets in a wireless communication system in accordance with various embodiments of the present invention.

FIG. 3 is a diagram illustrating the structure of a packet for an IEEE 802.11ac wireless communication system in accordance with an embodiment of the present invention. The packet of FIG. 3 has a mixed format for compatibility with 802.11a/n, and includes a field 310 for 802.11a/n, fields for 802.11ac, and a data field 340. The fields for 802.11ac include a common field 320 for 802.11ac and a field 330 for each user of 802.11ac. Here, the field 310 for 802.11a/n includes information to be notified to each user of 802.11a/n, the common field 320 for 802.11ac includes information to be commonly notified to multi-users of 802.11ac, the field 330 for each user of 802.11ac includes information to be transmitted to each of the multi-users of 802.11ac, and the data field 340 includes data to be transmitted to each user. It is possible for an 802.11ac system to acquire desired information through the field 310 for 802.11a/n used for the existing wireless communication system, as well as the fields 320 and 330 for 802.11ac. Furthermore, the field 330 for each user of 802.11ac and the data field 340 may be provided to each user in different formats. For example, the configurations and/or lengths of sub-fields of the fields 330 and 340 may be set to be different for each user.

Referring to FIG. 3, section (a) indicates a transmission length of the packet transmitted for 802.11ac from the common field 320, which stores common information for all multi-users, to the data field 340, and section (b) indicates a transmission length of the field 330 for each user of 802.11ac and the data field 340, except for the common field 320 commonly applied to multi-users. Information on the sections (a) and (b) may be included in a signal field (in the field 310) for legacy or the common field 320 for 802.11ac according to the purpose of the information. Otherwise, the information may be included both in the signal field 310 and the common field 320.

Figure 4:
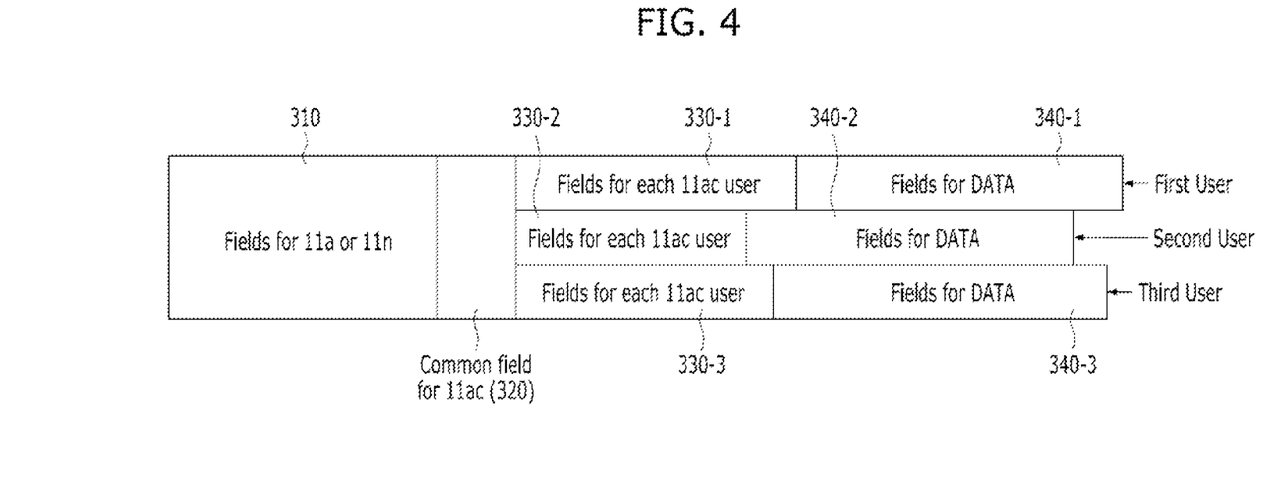
Figure 5:
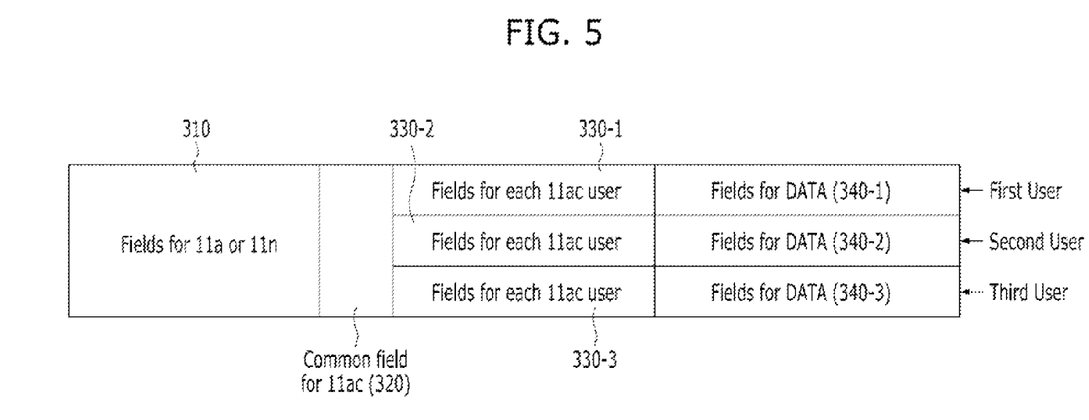
Figure 6:
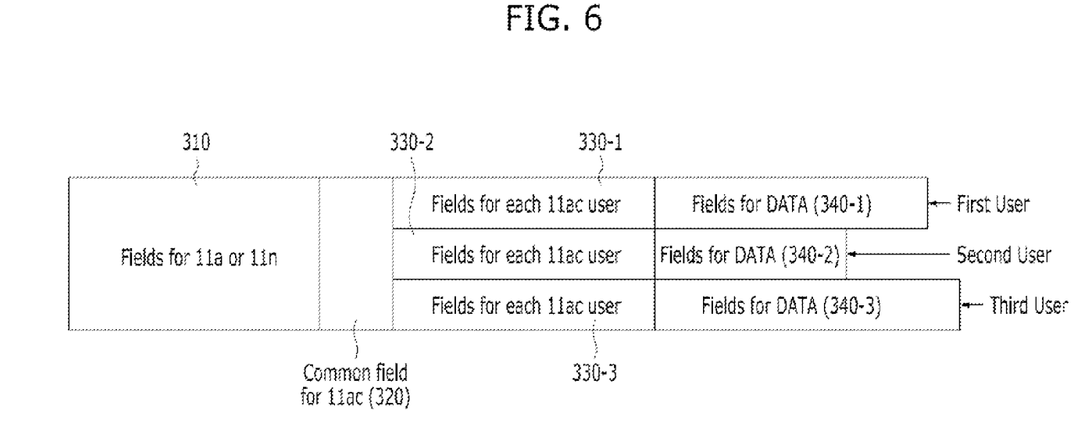

The field 330 for each user of 802.11ac may include a training field (referred to as a 'VHT training field') and a signal field (referred to as a 'VHT signal field'), as with 802.11a/n. Depending on whether a long training field (referred to as 'VHT LTF') of the VHT training field is resolvable or non-resolvable, the field 330 for each user of 802.11ac may be configured in a different manner with respect to each user. FIG. 4 illustrates an example in which the VHT LTF is non-resolvable. In FIG. 4, fields 330-1, 330-2 and 330-3 for each user of 802.11ac have different lengths with respect to each user. Furthermore, data fields 340-1, 340-2 and 340-3 may have the same data length or different data lengths with respect to each user. FIGS. 5 and 6 illustrate an example in which the VHF LTF is resolvable. In FIGS. 5 and 6, fields 330-1, 330-2 and 330-3 for each user of 802.11ac have the same length with respect to each user. FIG. 5 illustrates an example in which data fields have the same length with respect to each user, and FIG. 6 illustrates an example in which data fields have different lengths with respect to each user.

Referring to FIGS. 3 to 6, the 802.11ac packet requires a field for transferring common information to each user and a field for transferring different pieces of information to each user. Specifically, the existing 802.11a/n defines a byte-unit length. However, when simultaneously transmitting packets with different lengths to multi-users in accordance with the embodiment of the present invention, length information transferred to the multi-users should have different values. In this regard, in order to efficiently control a VHT packet for multi-users, a method is required to appropriately inform each user of different pieces of information.

As described above, the IEEE 802.11 legacy MAC protocol of the wireless communication system transmits data by the MPDU including an MSDU, when a transmission right for a wireless resource is acquired. The IEEE 802.11 enhanced MAC protocol transmits data by the TXOP. The high-throughput (HT)-MAC protocol of IEEE 802.11n transmits data by the A-MPDU. In the present invention, when a wireless system acquires a transmission right, the wireless system simultaneously transmits frames to multi-users based on the MU-MIMO technology. This is defined as an MU-MIMO transmission unit (an MU-MIMO TX unit) of the VHT-MAC protocol.

Furthermore, the VHT MAC protocol in accordance with the embodiment of the present invention may transmit a single MSDU or a MPDU. However, since the VHT MAC protocol should support throughput equal to or higher than that of the HT-MAC protocol, the VHT MAC protocol may transmit an A-MPDU within a VHT frame. The method proposed in the embodiment of the present invention may be supported in both of the resolvable example and the non-resolvable example, which have been described above.

Figure 7:
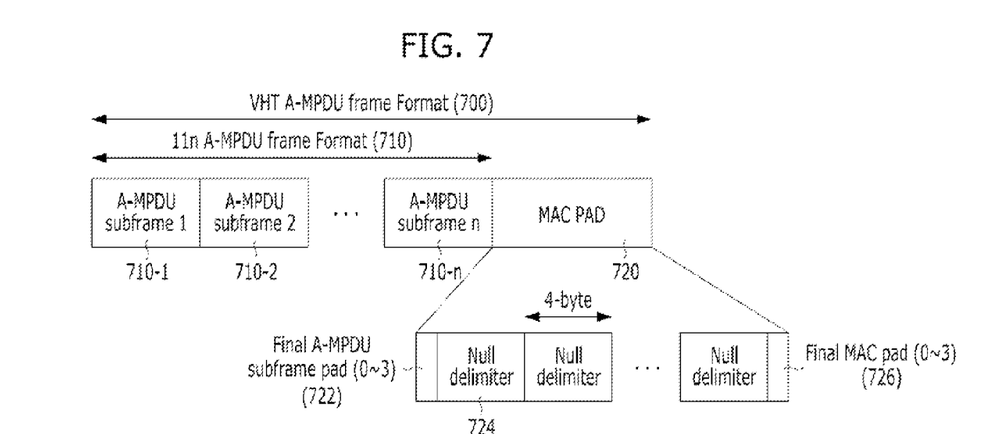
FIG. 7 is a diagram illustrating the structure of a MAC A-MPDU frame in accordance with an embodiment of the present invention.

FIG. 7 is a diagram illustrating the structure of a MAC frame included in the data field 340 of the sections (a) and (b) illustrated in FIG. 3. Referring to FIGS. 4 to 6, when data has different lengths or the VHT LTF is non-resolvable, the transmission end times of packets for each user are different from each other. Consequently, when transmitting packets with different lengths to multi-users, a pad of a MAC layer or a PHY layer is added next to data with a length shorter than the maximum transmission length, thereby allowing transmission lengths for the multi-users to be equal to each other. FIG. 7 illustrates an example in which a MAC PAD 720 is added next to the final A-MPDU subframe 710-n in order to allow the transmission end times of packets for multi-users to coincide with each other.

The A-MPDU subframe 710-n defined in 802.11n includes one or more A-MPDU subframes 710-1, 710-2, . . . , 710-n. Each of the A-MPDU subframes 710-1, 710-2, . . . , 710-n may include a delimiter, a MPDU, and 0~3 pad. However, a 0~3 pad 722 is not added to the final A-MPDU subframe of 802.11n. The 0~3 pad refers to a 0~3 byte pad. Meanwhile, in the VHT, the 0~3 pad 722 is added to the final A-MPDU subframe 710-n such that all A-MPDU subframes including the final A-MPDU subframe can be processed in units of four bytes. In FIG. 7, this part is represented by the 'final A-MPDU subframe pad 722'. That is, it is necessary for the VHT system to maintain 4-byte alignment with respect to all A-MPDU subframes including the final A-MPDU subframe. Next to the 'final A-MPDU subframe pad 722', it may be possible to add null delimiters 724 of which the MPDU length is '0', which are necessary for coinciding the transmission end times of packets with each other. The null delimiter 724 may be the same as the null delimiter of 802.11n. Since the null delimiter 724 is 4 bytes, a 0~3 pad (726: a final MAC pad) is added to a part which is not filled by the null delimiters 724. Similarly, the 0~3 pad refers to a 0~3 byte pad.

The transmission length of a PPDU including the MAC A-MPDU for the VHT illustrated in FIG. 7 may be transmitted to each user as byte-unit length information as with 802.11a or 802.11n, or as a symbol number indicating data transmission duration. If the byte-unit length information is transmitted, a predetermined number of bits with a specific length are required in order to indicate the transmission of the byte-unit length information.

Meanwhile, the 'tail & pad' fields 144 and 234 illustrated in FIGS. 1 and 2 are positioned at the end of actually meaningful data transmitted to a user (a receiver), and is the final information of the data fields 140 and 230, which is necessary for receiving and processing a packet at the PHY layer of a user. For example, the tail field may be used for returning a convolutional encoder to a zero ("0") state, and the pad field may be used as dummy data for adjusting a preset size of a frame.

When the length information of a packet is transmitted as the symbol number, a smaller number of bits for length information are necessary as compared with the case in which the byte-unit length information is transmitted. However, since it is not possible for the PHY layer of the user to recognize the position of the final byte of meaningful data in the packet received therein, it is not possible to recognize the accurate position of the 'tail & PHY pad' field. In this regard, it is necessary to position a 'PHY pad & tail' field at the end of a symbol in which the final data (e.g., MAC MPDU) exists. At this time, differently from the case in which a PHY pad field is positioned next to a tail field in the existing wireless communication system (802.11a/n), the tail field may be positioned next to the PHY pad field (refer to FIG. 8). In this way, even if the length information of a packet is transmitted as the symbol number, since the tail field is positioned at the end of the final symbol, it is possible for a user to find the tail field.

Figure 8:
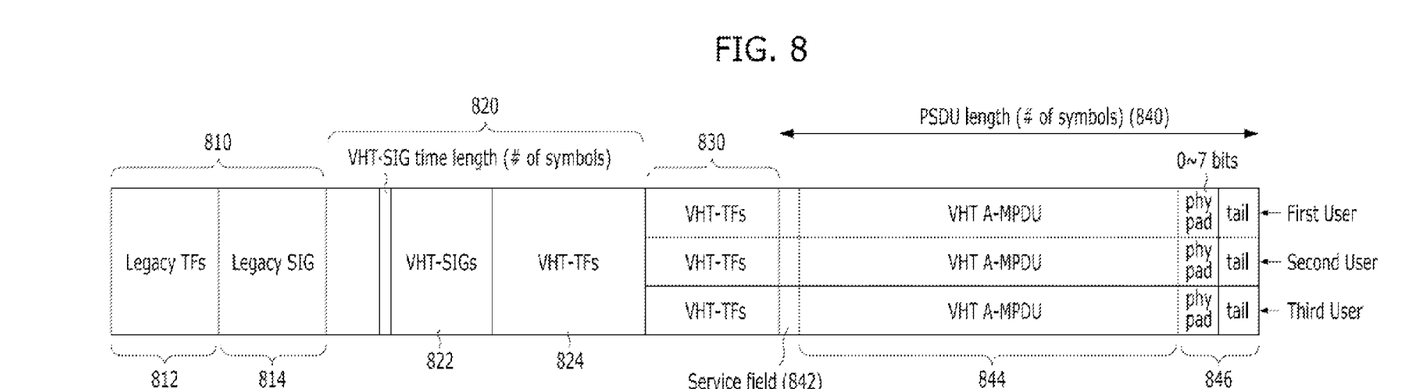
FIG. 8 is a diagram illustrating the case in which the length of a packet is transmitted using a symbol number in a wireless communication system for multi-users.

FIG. 8 illustrates an example in which the length of the packet is represented by the symbol number and the tail field is positioned at the end of the final symbol as described above. In accordance with the embodiment of the present invention, the length of the packet may be from a service field 842 to a 'PHY pad & tail field 846', or from the common field 820 or the field 830 storing information to be transmitted to each user of the VHT to the 'PHY pad & tail field 846', as illustrated in FIG. 8.

A packet in the wireless communication system in accordance with the embodiment of the present invention may include fields 310 and 810 for legacy, common fields 320 and 820 storing information to be commonly transmitted to multi-users of the VHT, fields 330 and 830 storing information to be transmitted to each user of the VHT, and data fields 340 and 840 transmitted to each user.

The field 810 for legacy may include a training field 812 and a signal field 814 for legacy. The common field 820 for the multi-users of the VHT may include a signal field (822: VHT-SIGs) and a training field (824: VHT-TFs) which are to be commonly transmitted to the multi-users of the VHT. The field 830 storing information to be transmitted to each user of the VHT may be a training field (VHT-TFs) for each user of the VHT, and may further include a signal field (VHT-SIGs) for each user of the VHT. The signal field for each user of the VHT may have a length of 0~n (n≥1) symbols and may be positioned at the front, intermediate or end of the VHT-TFs 830 illustrated in FIG. 8. That is, the signal field for each user of the VHT may be positioned between the common field 820 and the VHT-TFs 830, in the VHT-TFs 830, or between the VHT-TFs 830 and the service field 842. The service field 842 of the PHY is positioned at the frontmost portion of the data field 840 to be transmitted to each user, and may have a value '0' of 16 bits before being scrambled by a scrambler and be initialized to a pseudo-random nonzero seed value, similarly to the service fields 142 and 232 illustrated in FIGS. 1 and 2. At this time, the scrambler nonzero seed value is represented by 9 bits and remaining 7 bits may be reserved bits. The above-mentioned 'PHY pad & tail field 846' is added to the last portion of the data field 840 to be transmitted to each user. In the embodiment, the 'PHY pad & tail field 846' may be represented by one byte.

Figure 9:
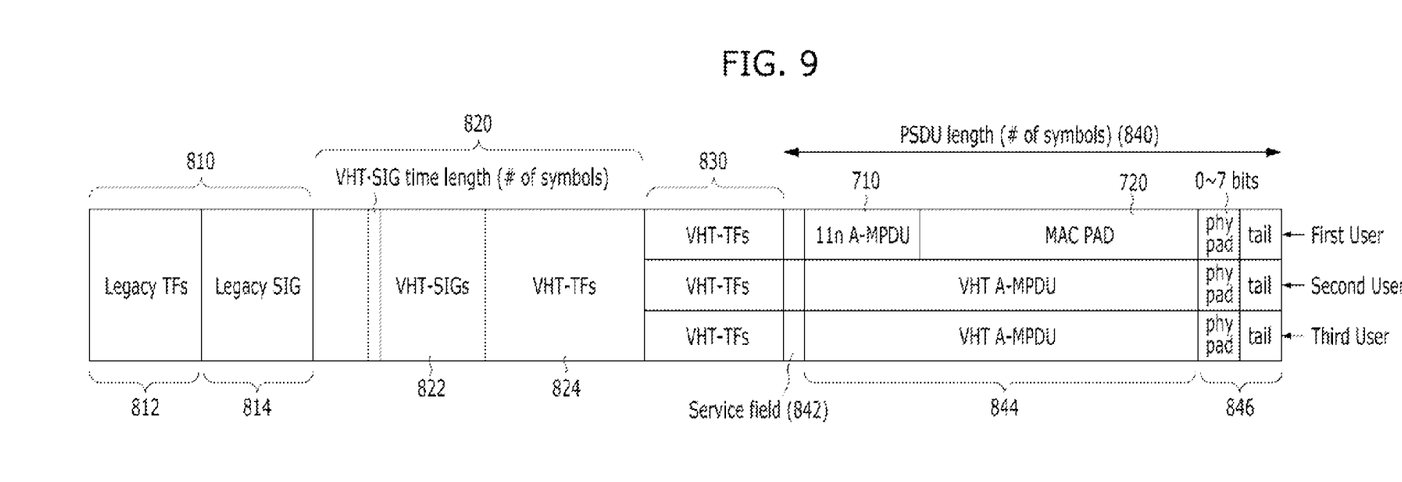
FIG. 9 is a diagram explaining a problem occurring in the case in which the length of a packet is transmitted using a symbol number in a wireless communication system for multi-users.

The VHT A-MPDU included in the data field 840 to be transmitted to each user may have a configuration as illustrated in FIG. 7. At this time, as illustrated in FIG. 9, when the length of data 710 for a single user (a first user) is significantly shorter than that of other users (second and third users), throughput may deteriorate as compared with overhead (e.g., a PLCP, a training field and the like) for a system that simultaneously transmits a packet to multi-users (first to third users). Furthermore, overhead occurs in the first user due to a significant long MAC PAD 720 as compared with the second and third users. In order to reduce the overhead due to the MAC PAD 720, a 'tail & PHY pad' is added next to the last bit of the final A-MPDU subframe 710-*n* (722). In such a case, the length of the packet is transmitted in units of bytes.

Figure 10:
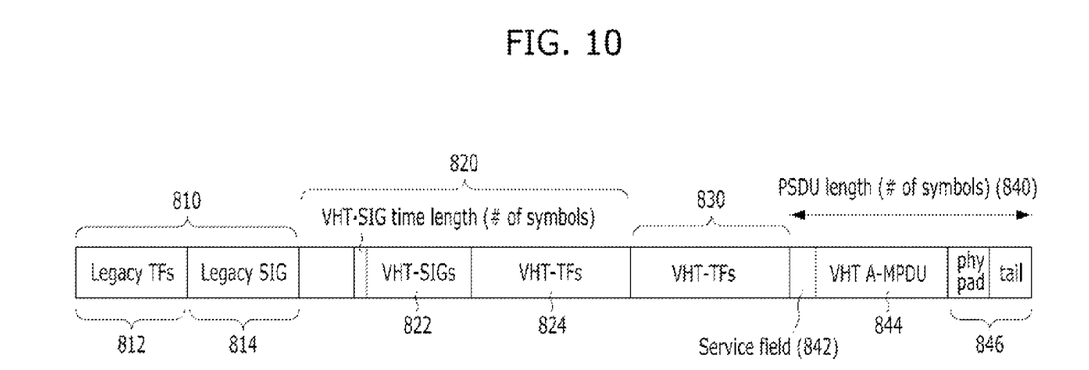
FIG. 10 is a diagram explaining a problem occurring in the case in which the length of a packet is transmitted using a symbol number when the packet is transmitted to a single user.

The above-mentioned problem of the overhead may also occur in the case in which a packet is transmitted to a single user, which will be described with reference to FIG. 10. If the length of a packet is transmitted as the symbol number when transmitting the packet to a single user, since VHT frame overhead and MAC pad overhead occur, throughput deterioration may occur. That is, a MPDU to be transmitted to the single user is sent in the form of the A-MPDU subframe, resulting in the occurrence of overhead (VHT frame overhead) due to the delimiter and the 0~3 pad included in the A-MPDU subframe, and the null delimeter 724 and the final MAC pad 726 may be added in order to adjust the length of the packet in units of symbols, resulting in the occurrence of overhead (MAC frame overhead). Even when transmitting a single MPDU to the single user, the VHT frame overhead and the MAC frame overhead may occur. That is, this is because the transmission of the single MPDU represents the transmission of a single A-MPDU subframe to a VHT A-MPDU 844 illustrated in FIG. 10.

In this regard, the embodiment of the present invention proposes a method for transferring the length of a packet to be transmitted to each user using the same field in units of bytes or symbols in order to the above-mentioned overhead when simultaneously transmitting a packet to one or more users.

Whether the length of the packet to be transmitted to each user is transferred in units of bytes or symbols can be determined according to various criteria. For example, when transmitting data (e.g., a single MPDU) with a length shorter than a specific length, a special management frame (e.g., various frames necessary for managing a wireless communication system), or a single MPDU due to the impossibility of aggregation, the length information of a packet can be transferred in units of bytes instead of the symbol number. In this way, the MAC pad overhead can be reduced. Furthermore, when trying to improve the throughput through data aggregation, the length of a packet can be transferred as the symbol number.

The case in which a packet is transmitted to a single user and the case in which packets are transmitted to multi-users including two or more users will be described below. When transmitting the packet to the single user, the length information of the packet may be transferred in units of bytes. This is because it is possible to reduce the MAC pad overhead necessary in order to adjust the length of the packet in units of bytes. Meanwhile, when simultaneously transmitting packets to the multi-users, the length information of the packets may be transferred in units of symbols or bytes according to the lengths of the packets to be transmitted to each user. That is, if the lengths of the packets to be transmitted to each user are transferred in units of symbols, since overhead occurs (e.g., refer to FIG. 9), the lengths of the packets may be transferred to a user, which receives a packet with a short length, in units of bytes, and the lengths of the packets may be transferred to a user, which receives a packet with a long length, in units of symbols. For example, the lengths of the packets may be transferred to a user in units of bytes, which receives data (e.g., a single MPDU) with a length shorter than a specific length or a special management frame, and the lengths of the packets may be transferred to a user in units of symbols, which receives data with a length longer than a specific length or data aggregated in order to improve the throughput.

The length information of the packet, which may be expressed by two units (in units of bytes or symbols), may be included in a field (810, e.g., the L-SIG 814) for legacy, a common field (820, e.g., the VHT-SIGs 822) for VHT, or a field (830, e.g., a signal field for each user of the VHT) for each user of the VHT, and the position thereof is not limited. The packet length information on each user may be included in the field 830 for each user of the VHT, but may be included in the common field 820. When the packet length information on each user is included in the common field, length information on each user may be included therein together with information on each user.

Figure 11:
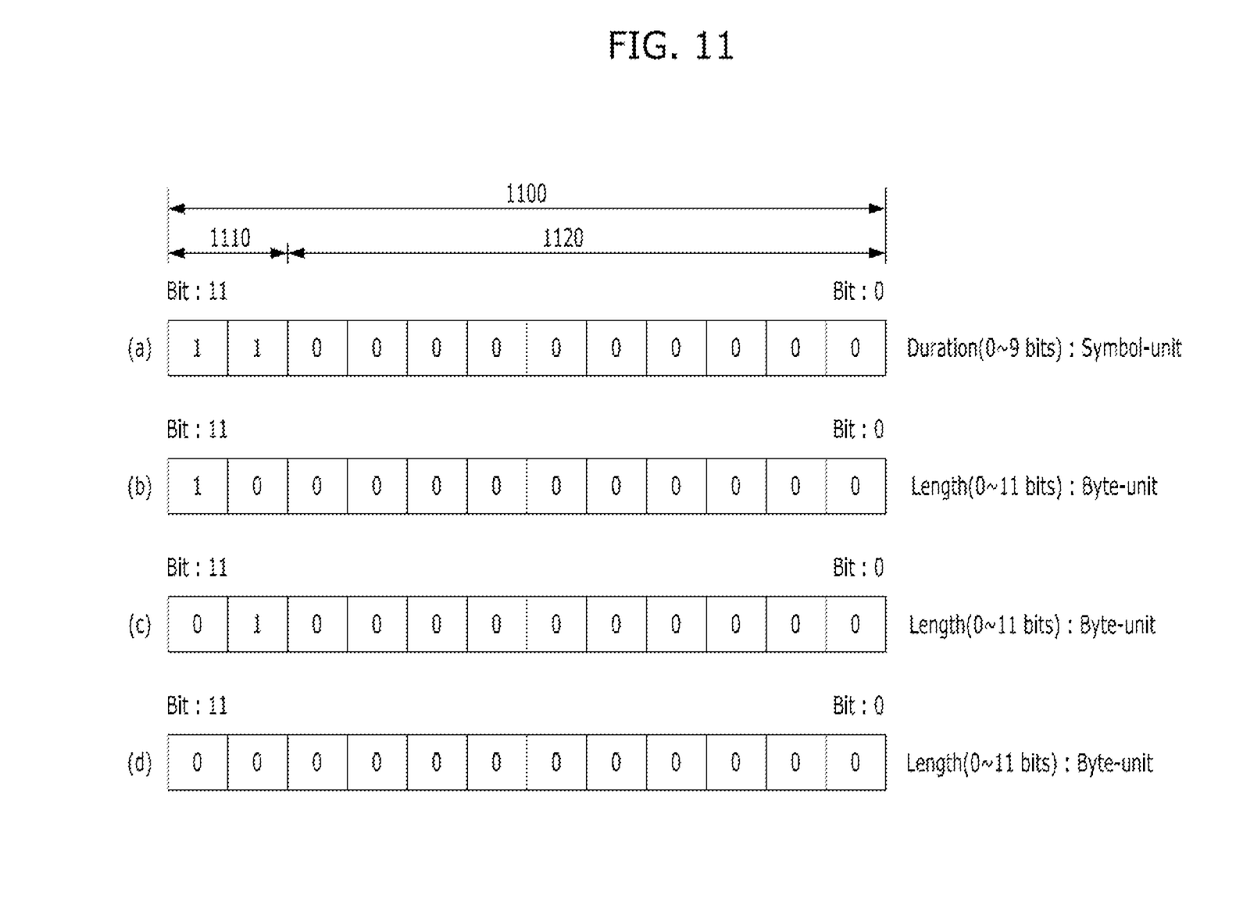
FIG. 11 is a diagram illustrating fields storing length information of packets in accordance with an embodiment of the present invention.

Since the wireless communication system in accordance with the embodiment of the present invention includes the length field in the legacy signal field (814: L-SIG) in order to achieve compatibility with legacy systems, a method for expressing length information of a packet in the range of the length field will be described as an example. The length field in the legacy signal field (814: L-SIG) is 12 bits. The maximum number of bytes, which can be expressed using the length field of 12 bits, is 4095, and the maximum transmission duration based on the maximum number of bytes cannot exceed 5.5 ms or more according to the L-SIG TXOP protection technology defined in 802.11n. Hereinafter, a method for expressing the transmission duration information (in units of symbols) or byte length information (in units of bytes) of a packet using 12 bits (1100) will be described with reference to FIG. 11.

A single MPDU includes data with the maximum length of 2304 bytes and a MAC header and has a length of 2400 bytes or less. Thus, the byte length information of the single MPDU can be expressed by 12 bits. In detail, the maximum length of the single MPDU does not exceed a value of '1100 0000 0000' bytes. Furthermore, the defined maximum TXOP length is 3.008 ms, can be expressed by 12 bits, and in detail, is equal to or less than '0011 1111 1111'. Thus, when 2 bits (1110) of the 12 bits (1100) are '11' (11xx xxxx xxxx), the length field represents transmission duration information, that is, a transmission symbol number of a packet (refer to (a) of FIG. 11). A part 1120, except for the 2 bits (1110), represents the transmission symbol number of the packet. When the 2 bits (1110) of the 12 bits (1100) are not '11' (10xx xxxx xxxx, 01xx xxxx xxxx, 00xx xxxx xxxx), the length field represents byte length information (refer to (b), (c), and (d) of FIG. 11). Here, a part 1100 represents the byte length of the packet.

So far, the case in which the length field is 12 bits has been described as an example. However, the present invention is not limited thereto. That is, the length field representing the length information of a packet in accordance with the embodiment of the present invention may include an indication field representing a byte-unit packet length or a symbol-unit packet length, and represent the length of the packet using the whole or a part (e.g., a field except for the indication field) of the length field. The indication field may be 1 bit or more. Consequently, a receiver of the packet can recognize the unit (a byte unit or a symbol unit) of length information through the indication field in the length field representing the length information of the packet, and also recognize the length of the packet according the corresponding unit using the whole or the part (e.g., the field except for the indication field) of the length field based on the unit of length information.

The field representing the length information of a packet is expressed by two units in accordance with the embodiment of the present invention, so that the efficiency of the system can be improved. For example, in the case of data transmission of a specific length or less such as a single MPDU, since data is transmitted in a byte-length, it is possible to reduce unnecessary overhead such as pad overhead. Furthermore, a SU-MIMO (single user MIMO) and a MU-MIMO (multi-user MIMO) can use the same packet structure.

So far, the case in which the length information of a packet transmitted to each user is represented has been described. However, the maximum length information of a packet transmitted to multi-users can be represented by the method in accordance with the embodiment of the present invention. At this time, the maximum length information of the packet transmitted to the multi-users can be transferred through the common field 820, the length information of the packet transmitted to each user can be transferred through the field 830 for each user, and the two pieces of information can be transferred.

Figure 12:
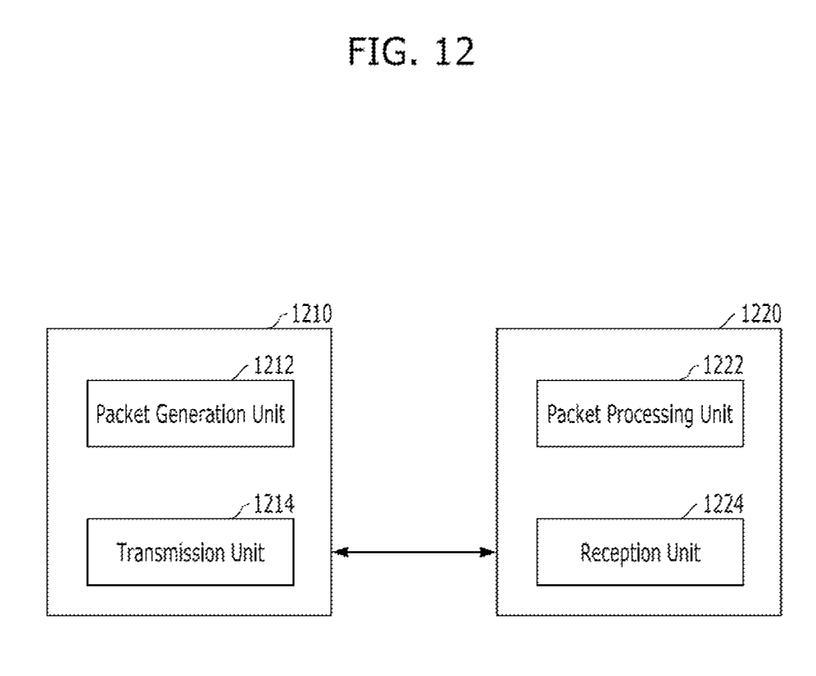
FIG. 12 is a diagram illustrating the configurations of a packet transmitter and a packet receiver in accordance with an embodiment of the present invention.

Hereinafter, the configurations of a packet transmitter 1210 capable of simultaneously transmitting packets to one or more users and a packet receiver 1220 capable of receiving and processing such packets from the packet transmitter 1210 according to the above-described method will be described with reference to FIG. 12. Here, the duplicated descriptions as described above will be omitted. An AP and an STA of a wireless communication system may serve as a packet transmitter or packet receiver.

The packet transmitter 1210 includes a packet generation unit 1212 and a transmission unit 1214.

The packet generation unit 1212 is configured to generate packets to be transmitted to one or more users according to the above-described method.

The transmission unit 1214 is configured to simultaneously transmit the packets generated by the packet generation unit 1212 to the one or more users (the packet receiver 1220).

The packet receiver 1220 includes a reception unit 1224 and a packet processing unit 1222.

The reception unit 1224 is configured to receive the packet from the packet transmitter 1210, and the packet processing unit 1222 is configured to process the packet received in the reception unit 1224 according to the above-described method.

In accordance with the embodiment of the present invention, when simultaneously transmitting/receiving packets with different lengths to/from multi-users, a packet with a length shorter than a maximum packet length can be correctly processed, thereby reducing unnecessary overhead.

Furthermore, in accordance with the embodiment of the present invention, even when transmitting a packet to a single user, it is possible to reduce unnecessary overhead.

In addition, since the VHT A-MPDU frame defined in the embodiment of the present invention basically maintains the A-MPDU frame structure and the PSDU structure of the PHY which are defined in 802.11n, the VHT A-MPDU frame can be easily applied without a specific change in the structure thereof.

Moreover, since the multi-antenna technology for supporting multi-users can be dynamically configured according to services based on the wireless communication system proposed in the embodiment of the present invention, various services can be supported and the throughput improvement effect can be expected.

While the present invention has been described with respect to the specific embodiments, it will be apparent to those skilled in the art that various changes and modifications may be made without departing from the spirit and scope of the invention as defined in the following claims.

What is claimed is:

1. An apparatus configured for processing a packet, from a transmitter in a wireless communication system, comprising:
    a receiver configured to receive the packet, wherein the packet comprises a legacy training field, a legacy signal field including a length field that includes length information, Very High Throughput (VHT) signal fields, a VHT training field, and a data field; and
    a packet processor configured to process the packet, by using the length information,
    wherein a first VHT signal field among the VHT signal fields is positioned between the legacy signal field and the VHT training field, and a second VHT signal field among the VHT signal fields is positioned between the VHT training field and the data field,
    wherein the data field comprises a data unit comprising Aggregate-Medium Access Control Protocol Data Unit (A-MPDU) subframes, a Medium Access Control (MAC) pad added to the data unit, and a physical pad added to the MAC pad, and
    wherein the MAC pad comprises a first pad having a length of 0 to 3 bytes, a second pad having a length of a multiple of 4 bytes, and a third pad having a length of 0 to 3 bytes.

2. The apparatus of claim 1, wherein the length field in the legacy signal field is related to a transmission time of the packet.

3. The apparatus of claim 1, wherein the length field in the legacy signal field represents a number of symbols in the packet.

4. The apparatus of claim 1, wherein the length field in the legacy signal field has a length of 12 bits.

5. The apparatus of claim 1, wherein the physical pad has a length of 0 to 7 bits.

6. The apparatus of claim 1, wherein each of the A-MPDU subframes has a length of a multiple of 4 bytes, except for the last of the A-MPDU subframes.

7. A method for processing a packet, by a packet receiving apparatus in a wireless communication system, wherein the packet receiving apparatus comprises a receiver and a packet processor, the method comprising:

receiving, by the receiver, the packet, wherein the packet includes a legacy training field, a legacy signal field including a length field that includes length information, Very High Throughput (VHT) signal fields, a VHT training field, and a data field; and processing, by the packet processor, the packet, wherein the data field comprises a data unit comprising Aggregate-Medium Access Control Protocol Data Unit (A-MPDU) subframes, a Medium Access Control (MAC) pad added to the data unit, and a physical pad added to the MAC pad, wherein the MAC pad comprises a first pad having a length of 0 to 3 bytes, a second pad having a length of a multiple of 4 bytes, and a third pad having a length of 0 to 3 bytes.

8. The method of claim 7, wherein the physical pad has a length of 0 to 7 bits.

9. The method of claim 7, wherein the length field in the legacy signal field is related to transmission time of the packet.

10. The method of claim 7, wherein the length field in the legacy signal field represents a number of symbols in the packet.

11. The method of claim 7, wherein the length field in the legacy signal field has a length of 12 bits.

12. The method of claim 7, wherein each of the A-MPDU subframes has a length of a multiple of 4 bytes, except for the last of the A-MPDU subframes.

* * * * *